United States Patent [19]
Kaukeinen

[11] 3,836,302
[45] Sept. 17, 1974

[54] FACE PLATE RING ASSEMBLY FOR AN EXTRUSION DIE

[75] Inventor: Ralph M. Kaukeinen, Middlebury Center, Pa.

[73] Assignee: Corning Glass Works, Corning, N.Y.

[22] Filed: Mar. 31, 1972

[21] Appl. No.: 239,953

[52] U.S. Cl.............................. 425/197, 425/461
[51] Int. Cl............................................... B29f 3/04
[58] Field of Search ........................... 425/190–192, 425/197, 198, 461, 382.2, 380

[56] References Cited
UNITED STATES PATENTS

| | | | |
|---|---|---|---|
| 1,983,330 | 12/1934 | Welch | 425/198 X |
| 2,587,930 | 3/1952 | Uschmann | 425/191 |
| 2,908,037 | 10/1959 | Harkenrider | 425/192 |
| 2,923,972 | 2/1960 | DeGhetto | 425/192 |
| 3,038,201 | 6/1962 | Harkenrider | 425/197 |
| 3,500,499 | 3/1970 | Goosens | 425/192 |
| 3,559,252 | 2/1971 | Schmidt | 425/382 |

FOREIGN PATENTS OR APPLICATIONS

| | | | |
|---|---|---|---|
| 1,579,016 | 6/1970 | Germany | 425/197 |
| 94,778 | 11/1969 | France | 425/192 |

*Primary Examiner*—J. Spencer Overholser
*Assistant Examiner*—David S. Safran
*Attorney, Agent, or Firm*—Burton R. Turner; Clarence R. Patty, Jr.

[57] ABSTRACT

A mask or face plate, having an orifice or opening formed therethrough of desired size and configuration, is positioned against the discharge face of an extrusion die. The mask restricts the flow of extrudable material through the die so that such material will conform to the size and configuration of the opening or orifice provided in such mask or face plate. The mask or face plate is preferably part of a ring assembly which may be removably attached to the extrusion die structure. When such die is provided with a plurality of core pins for forming cellular or honeycomb structures, the orifice formed in the face plate is preferably provided with a tapered inlet opening in communication with the discharge face of such die, so as to partially collapse the peripheral cells engaging the tapered surface as they are moved radially inwardly by such surface, and thereby form an integral skin or sheath about the remainder of the honeycomb structure as it is being extruded.

3 Claims, 2 Drawing Figures

PATENTED SEP 17 1974

3,836,302

FACE PLATE RING ASSEMBLY FOR AN EXTRUSION DIE

BACKGROUND OF THE INVENTION

This invention pertains to the art of manufacturing extruded articles from any extrudable material such as ceramic batches, molten glasses, plastics, molten metals, and similar materials which have the property of being able to flow or plastically deform during extrusion while being able to become sufficiently rigid immediately thereafter so as to maintain their structural integrity. More particularly, the present invention relates to an improved face plate ring assembly utilized in conjunction with an existing extrusion die for providing such extrusion die with greater versatility.

The extrusion die may be of virtually any known construction, however the face plate ring assembly of the present invention has particular application with respect to extrusion dies having multiple core pins for forming cellular or honeycomb structures, such as disclosed in application Ser. No. 196,986 of Rodney D. Bagley filed Nov. 9, 1971, now U.S. Pat. No. 3,790,654. That is, such extrusion dies for making honeycomb structures necessitate the formation of numerous core pins, and accordingly the manufacture of such dies is not only very complex but quite costly. Further, every time a honeycomb structure having a new size or shape was required, it necessitated the burdensome manufacture of an additional new costly die. Not only did this require the maintenance of a relatively large inventory of extrusion dies with different sizes and configurations, but also many of such dies became obsolete as size and shape requirements varied.

Accordingly, the present invention has overcome the problem of requiring a multiplicity of expensive and intricate extrusion dies for forming a plurality of extruded sizes and shapes, by providing a unique face plate ring assembly positionable over the discharge face of a standard extrusion die so as to restrict the flow of extrudable material through such die in such a manner to conform to the size and configuration of an orifice within the face plate of such assembly. In view of the fact that a plurality of face plates having orifices of different sizes and configurations may be positioned over the discharge face of a given extrusion die, the extrusion die formerly limited to the formation of only one given article, may now produce extrudable items with a variety of sizes and shapes as determined by the particular face plate or mask utilized with the face plate ring assembly.

SUMMARY OF THE INVENTION

In its simplest form, the present invention is directed to a face plate or mask for overlying a portion of the discharge face of an extrusion die so as to provide such die with greater flexibility and variability. That is, a plurality of such face plates or masks, each having its own individual orifice of desired size and configuration, may alternately be positioned over the outlet face of the extrusion die so as to provide a plurality of extrusions having different sizes and shapes from a single extrusion die.

The invention has particular application for use with extrusion dies for forming thin walled cellular or honeycomb structures which are provided with an integral shell or casing about the honeycomb network. Cellular or honeycomb structures refer to any structure having a plurality of openings or passages of any desired size or shape extending therethrough, and although the present invention is not limited to the manufacture of such structures, it does provide the advantage of being able to form a plurality of such structures with different sizes and shapes from the single extrusion die while simultaneously providing a bounding wall or shell about the desired shape.

The mask or face plate of the present invention has a blocking surface positioned adjacent the discharge surface of an extrusion die so as to block or mask-off the discharge flow of extrudable materials which would normally flow through the masked-off portion of the extrusion die. An opening or orifice of desired size and configuration is formed centrally through the mask or face plate, such that the inlet end of such orifice is in direct communication with the discharge face of the extrusion die. Since the mask has particular utility when utilized with an extrusion die for forming honeycomb structures, the orifice is preferably formed with a tapered inlet end portion, which portion tapers inwardly from the blocking surface toward the axial center of flow passing therethrough. Accordingly, honeycomb portions of extruded material adjacent the periphery of the inlet end are moved radially inwardly toward the axis of extrusion by the tapered side walls of the inlet portion and collapse the peripheral cells of the honeycomb structure near the outer surface of such extrusion to simultaneously form an integral skin or sheath about the extruded honeycomb structure as the extruded material passes through the orifice. The tapered inlet portion need not extend the entire axial length of the orifice, since the outlet portion of the orifice may be essentially parallel to the axis of extrusion, or if desired it may be slightly tapered either inwardly or outwardly of such axis.

In view of the fact that one object of the present invention is to provide existing extrusion dies for forming honeycomb structures with greater flexibility by adapting a plurality of masks or face plates with orifices of different sizes and configurations to fit over such dies, the ring assembly includes means for readily attaching or interchanging such face plates with the extrusion die apparatus. As a result, a plurality of different masks or face plates may individually be readily applied to or interchanged with an extrusion die assembly by the attachment means of the present ring assembly.

It thus has been an object of the present invention to provide a novel mask or face plate assembly for existing extrusion dies so as to provide greater flexibility and variability in the size and configuration of the extruded product which may be formed from such dies.

A further object of the present invention has been to provide a novel means for utilizing existing extrusion dies which form honeycomb structures, to form such structures with different sizes and configurations while simultaneously forming an integral skin or casing thereabout.

DESCRIPTION OF THE PREFERRED EMBODIMENTS

Figure 1:
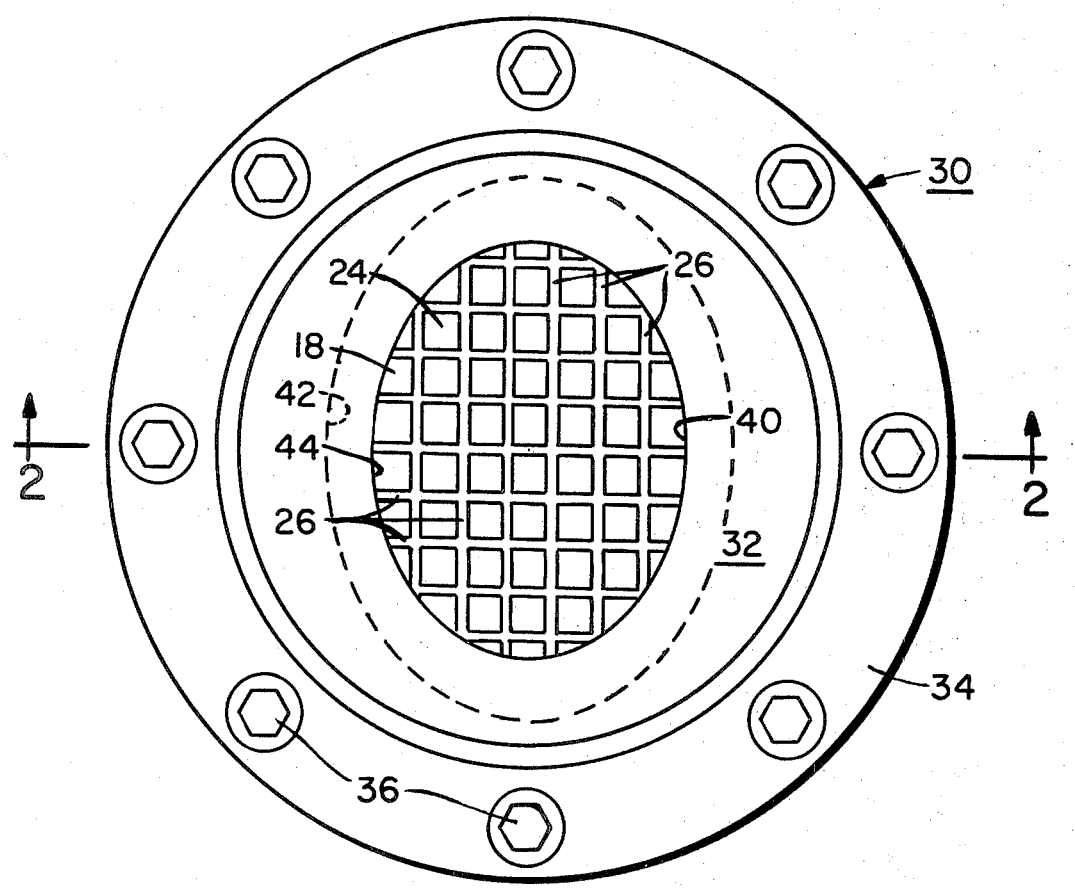
FIG. 1 is a bottom plan view of an extrusion die apparatus having a face plate ring assembly of the present invention applied thereto.
Figure 2:
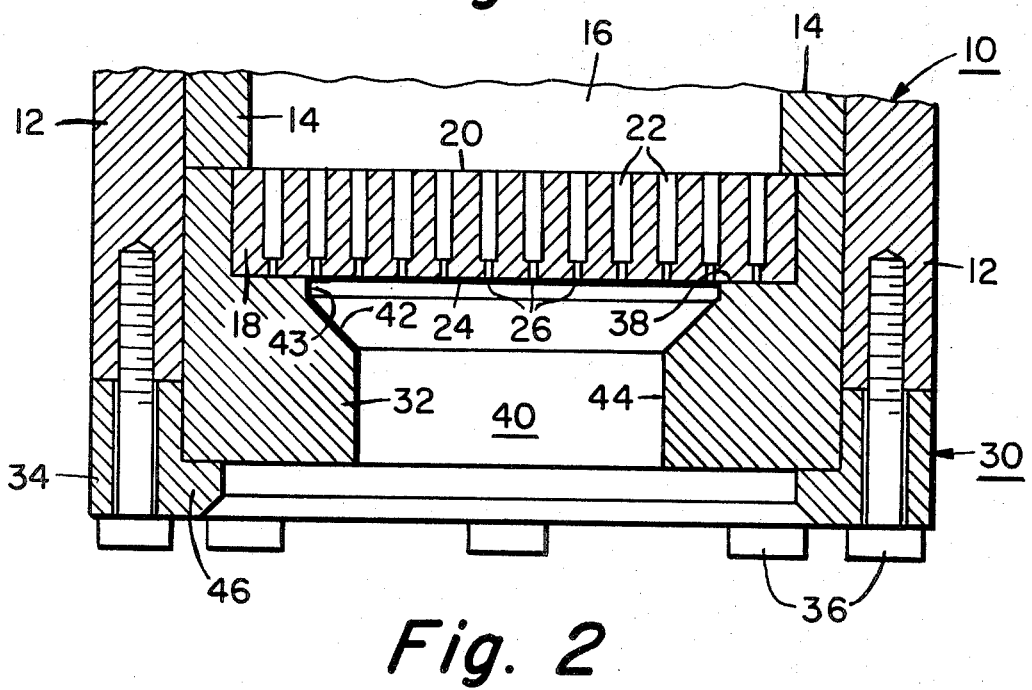
FIG. 2 is an elevational view in section taken along line 2—2 of FIG. 1 illustrating the positionment and function of a face plate ring assembly embodying the present invention.

Referring now to the drawings, an extrusion die apparatus 10 is shown including a support structure 12 for a cylinder 14 housing an extrusion chamber 16. An extrusion die 18 of any desired configuration is positioned adjacent the outlet end of the extrusion chamber 16. Since the present invention has particular application with respect to extrusion dies for forming honeycomb structures, such a die is shown for purposes of illustration. The die body 18 has an inlet face 20 provided with a plurality of openings or feed passageways 22 for feeding batch material from the extrusion chamber 16 to the matrix of a honeycomb structure. In addition, the die body 18 has an outlet face 24 which may be provided with a plurality of interconnected discharge slots 26. The feed passageways 22 communicate with selected areas of the discharge slots 26 so as to deliver the batch material from the extrusion chamber 16 to the discharge slots 26. As shown in FIG. 1, the interconnected discharge slots 26 form a gridwork through which the batch material is extruded to form the matrix of a coherent honeycomb structure.

A face plate ring assembly 30 is shown in position below the extrusion die apparatus 10. The face plate ring assembly 30 includes a face plate or mask 32, a retainer ring 34, and a plurality of bolts or cap screws 36 for readily removably securing the face plate 32 in position adjacent the outlet face 24 of die 18 by means of the retainer ring 34. The face plate 32 has a blocking surface 38 which is positioned adjacent the outlet face 24 of the die 18 and surrounds the central opening or orifice 40 of desired size and configuration extending through such face plate. The blocking surface 38 restricts the flow of extrudable material through the die 18 to those areas of such die which are in open communication with the orifice 40. That is, blocking surface 38 masks or blocks off that area of the outlet face 24 of extrusion die 18 which is not required when forming an article of the size and shape represented by the orifice 40 of the particular face plate or mask 32 being utilized.

The orifice 40 has a tapered inlet end portion 42 adjacent the outlet face 24 of die 18, and an outlet portion 44 which is shown as being substantially parallel to the axis of extrusion. Depending upon the material being extruded, the angle of taper with the axis of extrusion may vary anywhere from about 5° to about 60°, with the smaller taper obviously requiring a greater longitudinal length through the face plate, whereas the larger taper, producing a more sharper angle relative to the extrusion axis, requires a greater force to compress the edge material radially inwardly for flow through the outlet portion 44. As previously mentioned, the tapered inlet end portion has particular utility when utilized with a die for forming honeycomb structures so that an integral skin or shell may be formed about the matrix of the honeycomb structure simultaneously with the extrusion of such structure. That is, as the extrudable material is extruded through die 18 the honeycomb material at the periphery of tapered inlet portions 42 is moved radially inwardly toward the axis of extrusion by the tapered surface. Accordingly, peripheral cells of the honeycomb material collapse and form an integral skin or sheath about the remaining matrix of the article as it is being extruded. It has been found, however, that when the angle of taper of inlet end portion 42 is greater than about 30°, it is preferable to provide such inlet portion with a straight entry zone 43 parallel to the axis of extrusion, so as to obtain a smoother skin about the article. Such entry zone 43 may extend from said blocking surface 38 parallel to the axis of extrusion for a distance of only about 0.030–0.060.

Since a major contribution of the present invention is the ability to utilize existing dies for honeycomb structures and form any number of extrusion sizes and shapes from such dies by applying different face plates or masks of the present invention having orifices of varying sizes and configurations, it is important that the face plates or masks on the extrusion die apparatus may be readily changed. Accordingly, the retainer ring 34 and cap screws 36 are utilized to releasably retain the face plate or mask 32 in position against the die 18. That is, retainer ring 34 has an inwardly extending flange 46 which surrounds a peripheral bottom portion of the face plate 32 and retains such plate in position by means of bolts or cap screws 36 which are joined into the support structure 12.

Although the orifice 40 is shown in the shape of an oval, the size and configuration thereof may vary as desired, and may include virtually any geometric shape such as round, square, triangular, elliptical, etc. Further, although the outlet portion of the orifice is shown as being substantially parallel to the axis of extrusion, it may be tapered slightly inwardly or outwardly as might be desired, and the taper of the inlet portion may be curved rather than linear as shown.

It will be appreciated that the various dimensions of the orifice may vary considerably with the material being extruded, however the following specific example is given as an illustration for extruding clay type material. A stainless steel face plate was formed having an elliptical orifice provided with an inlet portion having a 15° taper with the axis of extrusion and a longitudinal extent of ½ inch. The small end of the taper terminated into an outlet portion having a face extending ⅜ of an inch longitudinally through the remainder of the face plate and substantially parallel to the axis of extrusion. As a result, clay material which was extruded through a known honeycomb die, passed through the elliptical orifice of the face plate and peripheral portions of such material which engaged the tapered surface of the inlet portion were radially displaced toward the axis of the extrusion a distance of about 0.134 inches while moving longitudinally the ½ inch distance through the tapered part of the face plate. The collapsed cells about the periphery of the extrusion article formed a skin or collar thereabout, and the honeycomb matrix and skin were then discharged from the outlet portion of the face plate as an integral unit.

Although the now preferred embodiments of the invention have been set forth, it will be apparent to those skilled in the art that various changes and modifications may be made thereto without departing from the spirit and scope thereof as defined in the appended claims.

I claim:
1. In combination with extrusion die means for forming honeycomb structures having an inlet face provided with a plurality of separate feed passageways and an outlet face provided with a gridwork of interconnected discharge slots communicating with said feed passageways, the improvement comprising a face plate ring assembly including a face plate and means releasably retaining said face plate in direct communication with the outlet face of said extrusion die means, said face plate including an orifice extending longitudinally therethrough, blocking surface means surrounding an inlet portion of said orifice in abutting relationship with portions of the outlet face of said extrusion die means for blocking-off the flow of extrudable material through peripheral portions of said die means, said orifice having a tapered inlet portion in communication with the outlet face of said die means and an outlet portion extending through the remainder of said face plate, and said tapered inlet portion providing means for radially moving peripherally edge portions of extruded material contacting said tapered inlet portion radially inwardly to form a skin about the remainder of the honeycomb structure being extruded through said orifice.

2. A face plate assembly as defined in claim 1 wherein said tapered wall means is provided with a taper of between about 5° and 60° with respect to the axis of extrusion, and said inlet portion is provided with an entry zone between said tapered wall means and said blocking surface means which is substantially parallel to said axis of extrusion.

3. A face plate ring assembly as defined in claim 1 wherein said outlet portion is substantially parallel to the axis of extrusion through said orifice, said tapered inlet portion is provided with a taper between about 5° and 60° with a longitudinal axis extending therethrough, and said tapered inlet end portion is provided with a straight entry zone adjacent said outlet face which extends longitudinally along a portion of said orifice from said blocking surface.

* * * * *